Figure 1:
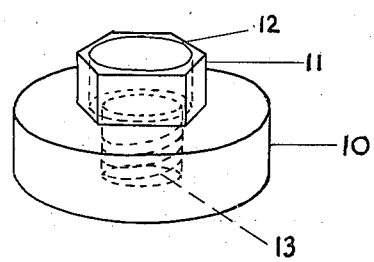

Feb. 11, 1947. E. KANN 2,415,695
ATTACHING NUTS TO PLATES
Filed Oct. 20, 1944

INVENTOR
EDUARD KANN
BY
AGENT

Patented Feb. 11, 1947

2,415,695

UNITED STATES PATENT OFFICE 2,415,695

ATTACHING NUTS TO PLATES

Eduard Kann, Summit, N. J.; now by judicial change of name to Edward Cann

Application October 20, 1944, Serial No. 559,595

3 Claims. (Cl. 85—32)

My invention relates to the attachment of nuts to a plate and more particularly to connected parts comprising a nut which is riveted to a plate-shaped member.

As my invention is particularly advantageous in connection with a so-called clinch nut or insert I shall describe the same with reference to such members. However, the invention is not limited thereto, but is applicable to other types of rivet members, such as bushings, bearings, or hubs, which are secured to a support by a riveting operation.

A clinch nut or insert is generally employed to fasten a body to a sheet or strip which is too thin and/or is of too weak a material to satisfactorily accommodate sufficiently strong screw threads. In a common embodiment a clinch nut comprises a body having a shoulder portion and a portion of reduced cross section which extends through a round hole in the sheet and has its end riveted over to form a bead. This riveted joint serves to hold the clinch nut to the sheet and utilizes the friction produced by the riveted bead to prevent undesired turning of the nut.

I have found that clinch nuts of the above type are frequently unsatisfactory because the nut turns when the screw is being screwed in or out and this is particularly prevalent when the screw threads are tight due to incorrect dimensions, or to damaging of the threads which frequently occurs when the nut is attached to the support sheet. This is especially disadvantageous because in most instances the clinch nut when attached to the sheet can not be held by a tool and thus it becomes impossible to loosen the screw.

To overcome the above disadvantage it has been proposed to form in the bead, small indentations which bear against or extend slightly into the material of the sheet. However, such methods are unsatisfactory because they weaken the bead and do not produce sufficient frictional resistance to turning of the nut. Furthermore in forming the bead and the indentations therein the threads of the nut and the bead itself are frequently damaged. In addition the bead forms a slight protuberance which prevents one from having a smooth surface on one side of the sheet.

The main object of my invention is to overcome the above difficulties and to provide a rivet member which, when fastened to a support, is secure against undesired turning.

Another object of my invention is to provide a rivet member which can be fastened to a sheet and also secured against undesired turning in a single riveting operation.

Another object is to provide a rivet member which can be secured to a support without damaging the member or threads provided therein.

A further object of my invention is to provide a rivet member which is flush with one surface of the support.

Further objects and advantages of my invention will appear as the description progresses.

The rivet member according to my invention has a shoulder portion and an extending portion of reduced cross section which is provided with a central bore and has an outer surface in the form of a prism, preferably with at least four faces. In securing the member to a support the extending prism portion is inserted in a hole in the support and the end of the portion is expanded to cause the edges of the prism surface to be pressed into the material of the support with the edges on an angle to the surface thereof. In some cases I prefer to also rivet the end of the prism portion so as to form a small bead.

I prefer to give the prism portion a hexagonal cross section as this gives much better results than a rectangular or octagonal cross section.

In accordance with another embodiment of my invention I provide the rivet member with a supporting flange by which it can be supported during the riveting operation so as to relieve pressure upon the portion provided with the threads.

Figure 2:
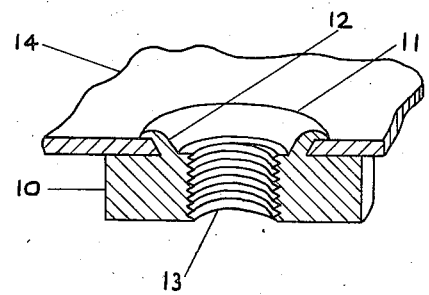
Figure 3:
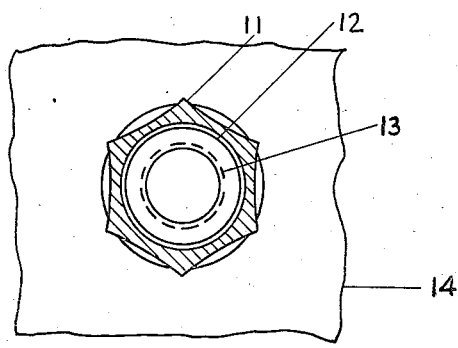
Figure 4:
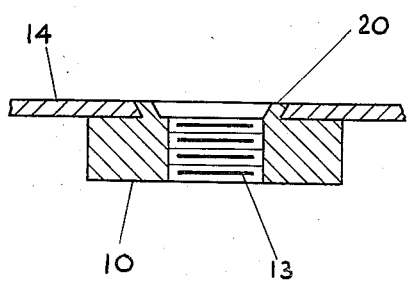
Figure 5:
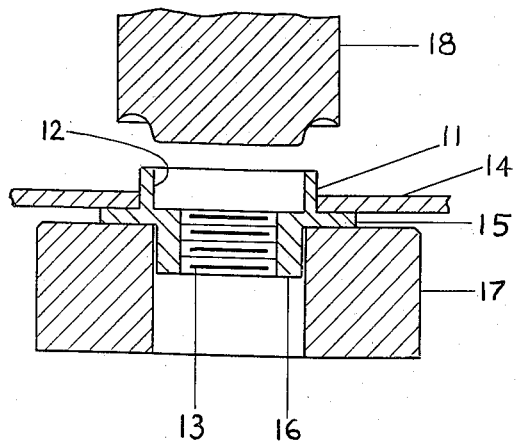

In order that my invention may be clearly understood and readily carried into effect I shall describe the same in more detail with reference to the accompanying drawing in which:

Fig. 1 is a perspective view of a clinch nut embodying my invention,

Fig. 2 is a sectionized perspective view of the clinch nut of Fig. 1 secured to a plate, Fig. 3 is a plan view of Fig. 2 sectioned in the plane of the upper surface of the plate, Fig. 4 is a sectional side view of a flush type clinch nut secured to a plate, and Fig. 5 is a sectional view of a clinch nut according to another embodiment of my invention and shows the tool used to attach the same to a plate.

The clinch nut shown in Fig. 1 comprises a cylindrical body portion 10 and an extending portion 11 of reduced cross section and has a central bore 12 provided on its lower portion with female threads 13. The nut may be of any desired material such as steel, brass, aluminum, or special alloys. In accordance with the invention portion 11 has the shape of a prism and as shown has a cross section in the form of a hexagon whose distance between opposite corners is slightly less than the diameter of the hole in the plate to which the nut is to be attached. Although the cross section may be in the form of any polygon, I prefer to use a hexagon as I have found that this gives the best results for reasons to be set forth below.

As shown in Fig. 2 the clinch nut of Fig. 1 is secured to a plate 14 of metal or plastic, and for this purpose the portion 11 is inserted in a round hole in the plate and the end is expanded and at the same time riveted over. For this purpose a suitable tool, for instance, a tool such as the punch 18 shown in Fig. 5, is inserted in the bore 12 so as to first enlarge the end thereof and thereby force the edges of the prism portion 11 into the material of the plate and then rivet over the end to form a bead or head.

I have found that when giving the prism portion 11 less than six sides, for instance, making it rectangular, particularly a square cross section, there is a tendency for this portion to crack when the end is expanded during the riveting operation. On the other hand if the prism portion 11 is given more than six sides, i. e., is given an octagonal or pentagon section, the "staking" or holding resistance against turning is not as good as in the case of a hexagonal section. By using a hexagonal section both these difficulties are overcome and the rivet member is firmly held in the plate and also secure against turning.

With reference to Fig. 3, it will be noted that the edges of the prism portion 11 extend into the material of the plate 14 so as to form a wedge-like joint. More particularly, each edge portion forms a wedge in the shape of an inverted pyramid which is embedded in the material of the plate and which serves both to hold the nut to the plate and to prevent turning. The concavity of the sides shown in Fig. 3, which is the result of a greater stretch in the middle of the sides than at the corners, tends to make the corners more pronounced; thus improving the "grip."

From Figs. 2 and 3 it will be noted that after the riveting operation the portion 11 has a shape which is similar to a truncated pyramid with a polygon base and sides which are slightly concave.

The nut shown in Fig. 4 is similar to that shown in the previous figures and the same reference numerals are used to denote the same parts. However, the prism portion 20 is given such height that when the nut is riveted to the plate 14 the upper portion of the nut is flush with or slightly below the upper surface of the plate. Although this construction is not as strong as that shown in Figs. 1 to 3 it has particular advantages, especially in aircraft constructions, because of the smooth surface provided by the flush end of the nut.

The nut shown in Fig. 5 is similar to that shown in Figs. 1 to 3 except that the lower part of portion 10 is reduced in diameter at 16 so as to form a flange 15. In attaching the nut to the plate 14 the shoulder 15 is supported on an anvil 17 with the portion 16 extending freely into a central hole in the anvil. During the riveting of the end of the portion 11, which is effected by a suitable punch 18, all the strain is taken by the shoulder 15 and there is no danger of the threads 13 being deformed, as would be the case if the lower end of portion 16 were rested upon the anvil.

While I have described my invention with reference to specific examples and constructions I do not desire to be limited thereto as obvious modifications will be readily apparent to those skilled in this art.

What I claim is:

1. Connected parts comprising a plate-shaped member provided with a substantially-circular hole, and a nut secured to said member, said nut having a portion extending into said hole and having a truncated pyramid-like shape, said portion having only the corner portions thereof embedded in the material of the member at the periphery of said circular hole.

2. Connected parts comprising a plate having a substantially circular hole, and a nut secured to said plate, said nut having a main portion with a surface bearing against one surface of said plate and a portion of reduced cross section extending into said hole, said latter portion being shaped as a truncated pyramid with its larger section remote from said main portion, only the corner portions of said pyramid portion being embedded in the material of the plate at the periphery of said hole.

3. Connected parts comprising a plate having a substantially circular hole, and a metallic nut secured to said plate, said nut having a main portion provided with a threaded bore and with a surface bearing against one surface of said plate and a portion of reduced cross section extending into said hole, said latter portion being shaped as a truncated pyramid with its larger section remote from said main portion and with the corner portions thereof embedded in the material of the plate at the periphery of said hole while forming spaces between the sides of said pyramid portion and the periphery of said circular hole.

EDUARD KANN.

REFERENCES CITED

The following references are of record in the file of this patent:

UNITED STATES PATENTS

| Number | Name | Date |
|---|---|---|
| 2,206,740 | Burke | July 2, 1940 |
| 1,705,463 | Andren | March 12, 1929 |
| 1,759,339 | Andren | May 20, 1930 |
| 1,872,616 | Andren | Aug. 16, 1932 |
| 1,919,552 | Hasselquist | July 25, 1933 |